(12) United States Patent
Dennis et al.

(10) Patent No.: US 7,353,921 B2
(45) Date of Patent: Apr. 8, 2008

(54) SELF ALIGNING BRAKE KIT

(75) Inventors: Brian P. Dennis, Kalamazoo, MI (US); Kenneth A. Dodd, Dowagiac, MI (US)

(73) Assignee: Ausco Products, Inc., Benton Harbour, MI (US)

( * ) Notice: Subject to any disclaimer, the term of this patent is extended or adjusted under 35 U.S.C. 154(b) by 250 days.

(21) Appl. No.: 11/210,285

(22) Filed: Aug. 25, 2005

(65) Prior Publication Data

US 2007/0045059 A1 Mar. 1, 2007

(51) Int. Cl.
*F16D 55/00* (2006.01)

(52) U.S. Cl. .................................. 188/73.32; 188/71.5

(58) Field of Classification Search .............. 188/71.5, 188/71.1, 73.1, 73.2, 73.31, 73.32, 73.39, 188/72.3
See application file for complete search history.

(56) References Cited

U.S. PATENT DOCUMENTS 4,358,001 A * 11/1982 Iverson ...................... 188/71.5
6,681,903 B2 * 1/2004 Tar et al. .................... 188/72.3

OTHER PUBLICATIONS

Ausco Products, Inc. Prior Art Drawing, Part No. 78449, 1 page, dated Aug. 11, 1999.
Ausco Products, Inc. Prior Art Drawing, Part No. 79507, 1 page, dated Jul. 14, 2000.
Ausco Products, Inc. Prior Art Drawing, Part No. 80215, 1 page, dated May 15, 2001.

* cited by examiner

*Primary Examiner*—Melanie Torres
(74) *Attorney, Agent, or Firm*—Renner, Kenner, Greive, Bobak, Taylor & Weber

(57) ABSTRACT

A brake (10) for the drive shaft of a vehicle or machine includes a housing (11) having an open end (12) which is adapted to be attached to the vehicle. A shaft is received in the housing (11) and is adapted to be attached to the vehicle drive shaft for rotation therewith. The shaft has a splined outer surface. A disc assembly (30) includes a plurality of rotatable discs (29) carried by the splined surface of the shaft, a plurality of stationary discs (32) which alternate with the rotatable discs (29) and a primary stationary disc (33) located at the end of the disc assembly (30), proximate to the open end (12) of housing (11). As mounted, a plurality of springs (42) cause the stationary discs (32) to engage the rotatable discs (29) to apply a braking torque to the shaft. A piston (21) is moveable to oppose the spring force and allow free rotation of the rotating discs (29). Prior to mounting, a plurality of shipping bolts (25) hold the disc assembly (30) together and axially aligned. Prior to mounting, springs (42) are held in place by a spring retaining ring (40) and by pin assemblies (44).

20 Claims, 6 Drawing Sheets

SELF ALIGNING BRAKE KIT

TECHNICAL FIELD

This invention relates to a brake especially adapted for use with construction machinery, such as backhoes, excavators and the like. More specifically, this invention relates to such a brake wherein no end plate is included and the brake kit is held together with pins until installation.

BACKGROUND ART

Construction machinery often times requires braking systems that incorporate fail-safe mechanisms. As a safety precaution, these mechanisms prevent shaft rotation when the machinery engine is not operating thus preventing machine and/or tool movement when the machine is shut down. A typical fail-safe braking mechanism uses springs to urge braking discs against rotating discs when no hydraulic pressure is being supplied to the system. When the engine is running, hydraulic pressure is supplied to annular pistons, which in turn compress the fail-safe springs and allow the shaft to turn freely.

Due to design and cost constraints, it is sometimes desirous to minimize the size and weight of the fail-safe brake. Some prior art braking systems have accomplished this by eliminating the end plate which typically closes the brake housing, thereby eliminating a portion of the weight and size of the brake. Brakes utilizing this design then use a part of the vehicle body to complete the brake enclosure. While such designs accomplish the goal of reducing brake size and weight, such makes brake installation more difficult, as the assembled housing and end plate holds the various components together during shipping and mounting. Prior art fail-safe brakes that do not include an end plate often require complex assembly procedures, as special care must be taken to align all of the brake components. Also, without the end plate it is difficult to install the brake assembly on a horizontal shaft because the components, such as discs and springs, tend to become disassembled in this orientation.

In view of these problems, it is evident that the need exists for a fail-safe brake system which eliminates an end plate but which maintains the integrity of the brake assembly before and during installation.

DISCLOSURE OF THE INVENTION

It is thus an object of the present invention to provide a brake for industrial machinery or a vehicle, which is compact.

It is a further object of the present invention to provide a brake, as above, which is lightweight.

It is an additional object of the present invention to provide a brake, as above, in which is easy to install.

It is yet another object of the present invention to provide a brake, as above, which will not disassemble prior to or during mounting.

These and other objects of the present invention, as well as the advantages thereof over existing prior art brakes, which will become apparent from the description to follow, are accomplished by the improvements hereinafter described and claimed.

In general, a brake made in accordance with the present invention is adapted to be carried by a rotatable shaft and includes a housing having an open end, a plurality of stationary discs in the housing and a plurality of rotatable discs. The rotatable discs are adapted to rotate with the shaft and are positioned to be engaged by the stationary discs. A plurality of springs bias the stationary discs to engage the rotatable discs, and a piston is movable to oppose the force of the springs. The housing, the rotatable discs and the stationary discs each have at least one bore. The bores each receive a shipping bolt, which is removed after positioning the brake on the shaft to allow the free rotation of the rotating discs.

In accordance with another aspect of the present invention, a brake is adapted to be carried by a rotatable shaft and includes a housing having an open end, a plurality of stationary discs in the housing and a plurality of rotatable discs. The rotatable discs are adapted to rotate with the shaft and are positioned to be engaged by the stationary discs. A plurality of springs bias the stationary discs to engage the rotatable discs, and a piston is movable to oppose the force of the springs. A spring retaining ring is slidably mounted to a pin assembly. The springs are thereby retained between the spring retaining ring and one of the stationary discs prior to positioning the brake on the shaft.

A preferred exemplary brake incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
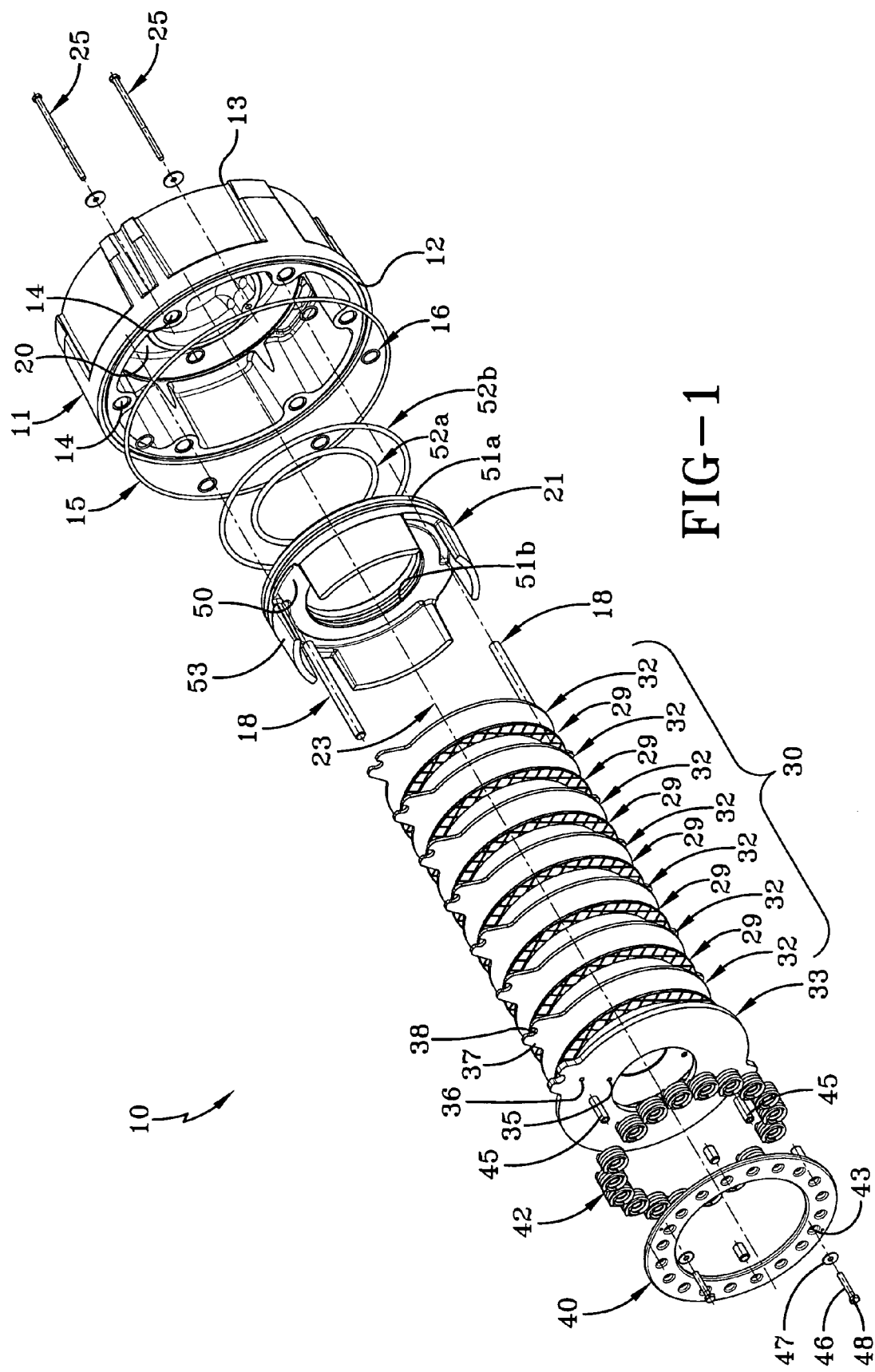
FIG. 1 is an exploded perspective view showing the components of a brake assembly made in accordance with the present invention.

A brake made in accordance with the present invention is indicated generally by the numeral 10 in the drawings, the components of which are shown in the exploded view FIG. 1. Brake 10 includes a housing, generally indicated by the numeral 11, which is preferably formed of cast iron and which is generally cylindrical in configuration having an open end 12 and a closed end 13. When mounted on a vehicle, the open end 12 of housing 11 is mounted flush against a vehicle frame (not shown), and housing 11 is attached to the vehicle by a plurality of bolts (not shown). The bolts are inserted through holes in the vehicle frame and received in matching circumferentially spaced bores 14 formed in housing 11. An o-ring 15 may be provided between the mating surfaces of housing 11 and the vehicle body, and a plurality of o-rings 16 may be provided around the bolts at the mating surfaces of housing 11 and the vehicle frame.

Housing 11 further includes at least two circumferentially spaced pin holes 17, each hole 17 being adapted to receive a torque pin 18. When mounted to a machine or vehicle, pin holes 17 are axially aligned with pin holes provided in the vehicle frame, thus securing the torque pins 18 therebetween. Torque pins 18 are cylindrical in shape and are preferably made of steel.

Housing 11 further includes a circumferential channel 20 located radially inward of bores 14 and centered about an axis 23. Channel 20 is adapted to receive an annular piston 21. Channel 20 serves as a piston housing, and to that end, when annular piston 21 is so inserted, a reservoir 22 is created. An input bore (not shown) communicates pressurized fluid from an external pressure source to the reservoir 22 thus selectively actuating the piston 21. Because of the orientation of the ring shaped reservoir, a large surface area is created with which the pressurized fluid may act on annular piston 21. Further, because of the ring configuration, the actuated piston 21 exerts a substantially uniform load primarily along an axis 23.

Housing 11 further includes a plurality of shipping bolt bores 24 located on the closed end 13. Shipping bolt bores 24 are located radially inward of bores 14 and are adapted to slidably receive shipping bolts 25. As will hereinafter be described, bolts 25 maintain the components of brake 10 together during shipping and mounting to a vehicle.

When mounted to a vehicle or machine, the end of a shaft (not shown) projects into housing 11 through open end 12. The shaft is coupled to the drive mechanism of the vehicle or machine, such that when a braking force is applied to the shaft, it is transmitted to the drive mechanism. A portion of the shaft located inside housing 11 is splined, which allows for mounting to a plurality of rotating discs 29, which are part of a disc brake assembly generally indicated by numeral 30. Rotating discs 29 are provided with splines 31 on the radially inner surface, which are adapted to mesh with the shaft splines. Disc brake assembly 30 further includes a plurality of stationary discs 32 which have a radially inner surface which fits over, but are not engaged by, the splined surface of the shaft. As best shown in FIG. 1, stationary discs 32 and rotatable discs 29 alternate to form a stack, which constitutes disc brake assembly 30. Stationary discs 32 and rotating discs 29 each include a pair of disc bores 34, each of which are adapted to slidably receive one of the plurality of shipping bolts 25. It should be appreciated that the inclusion of just two bores 34 is exemplary, and any number of disc bores 34 may be provided.

Disc brake assembly 30 further includes a primary stationary disc 33, which is located at the end of the disc stack proximate to the open end 12 of the housing 11. Primary stationary disc 33 has a radially inner surface which may fit over, but is not engaged by, the splined surface of the shaft. Primary stationary disc 33 includes a first pair of threaded holes 35 and a second pair of threaded holes 36. It should be appreciated that the inclusion of pairs of holes 35 and 36 is exemplary, and any number may be included. Prior to or during mounting, bores 34 of discs 29 and 32, bores 24 of the housing 11 and first threaded holes 35 of the primary stationary disc 33 are axially aligned. Shipping bolts 25 are slidably received into housing bores 24 and disc bores 34 and the threaded portion of shipping bolt 25 is received in first threaded holes 35. Thus, while in this orientation, shipping bolts 25 hold the disc assembly 30 axially aligned. Further, in this orientation, the splines 31 of rotating discs 29 are aligned such that the during installation, the splined shaft easily slides into the disc assembly 30. Also, the annular piston 21 and disc assembly 30 are held inside the housing 11 preventing disassembly of these elements.

The primary stationary disc 33 and stationary discs 32 are each provided with at least one pair of diametrically opposed ears 37 extending outwardly therefrom. Ears 37 include a groove 38, which receives one of the plurality of torque pins 18, which are fixedly positioned between housing 11 and the vehicle frame when mounted. When mounted to a vehicle or machine, this orientation prevents rotation of the stationary discs 32 and primary stationary disc 33 relative to rotating discs 30, while concurrently allowing them to slide axially along axis 23.

Figure 7:
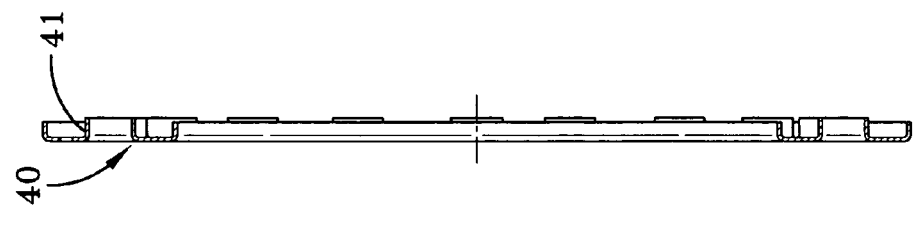
FIG. 7 is a sectional view of the spring retaining ring taken substantially along line 7-7 of FIG. 6.
Figure 6:
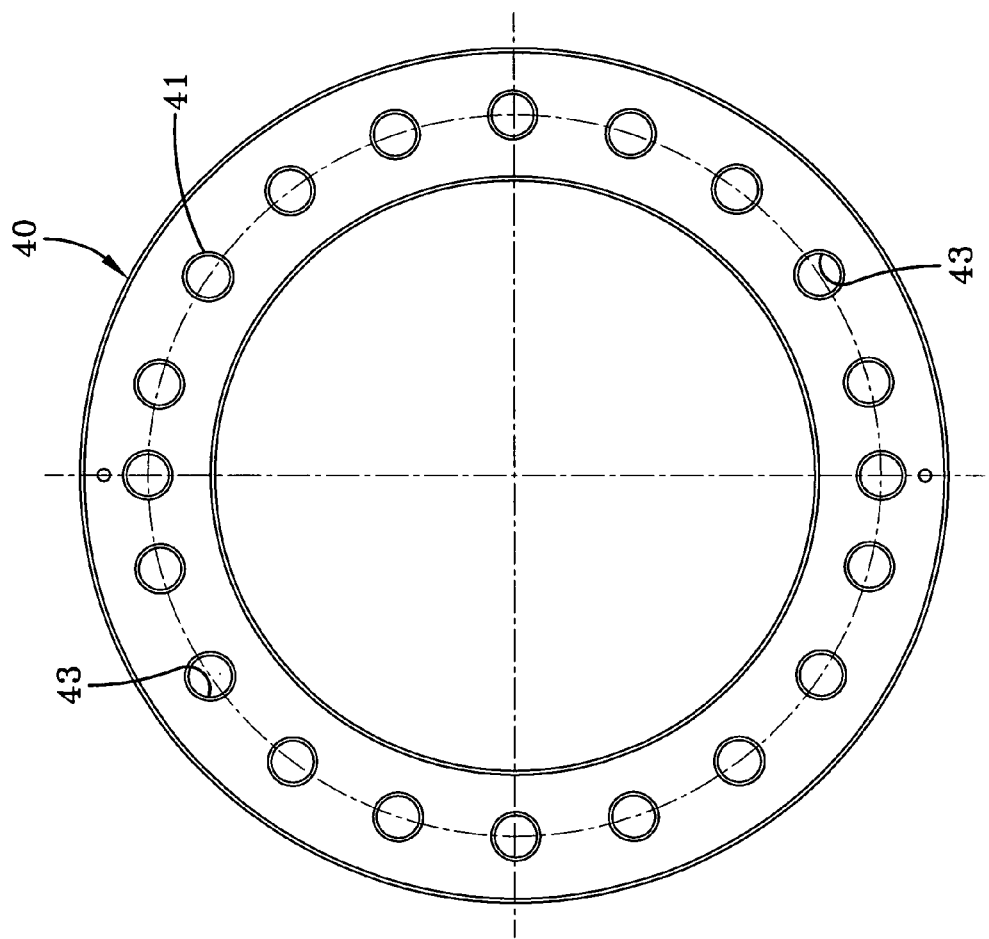
FIG. 6 is an elevational view of the spring retaining ring.

Brake 10 further includes a spring retaining ring 40, which is generally a thin annular disc and includes a plurality of circumferentially spaced projections 41 (FIGS. 6 and 7). Projections 41 are cylindrical and are each adapted to receive one of a plurality of springs 42. Spring retaining ring 40 further includes a plurality of bores 43 which are adapted to slidably receive one of a plurality of pin assemblies 44. It should be appreciated that while the drawings indicate only two spring assemblies 44, any number may be provided. Spring retaining ring 40 is oriented such that projections 41 extend toward primary stationary disc 33. Springs 42 are therefore located between spring retaining ring 40 and primary stationary disc 33.

Each pin assembly 44 includes a spacer 45, screw 46 and washer 47. The spacer 45 is generally a hollow tube sized to slidably receive screw 46. The washer 47 is positioned between the screw head 48 and spacer 45. Screw 46 is received in the second pair of threaded holes 36 on primary stationary disc 33, thereby holding the spacer 45 and washer 47 between the screw head 48 and primary stationary disc 33. Spring retaining ring 40 is free to slide axially on spacer 45 between the washer 47 and primary stationary disc 33. Prior to mounting on a vehicle or machine, the force of the springs 42 maintain spring retaining ring 40 spaced from the primary stationary disc 33. Spring retaining ring 40 is free to slide axially along spacer 45, and therefore, the force of the springs 42 press the spring retaining ring 40 against washer 47. Springs 42 and spacer 45 are necessarily sized such that when spring retaining ring 40 is contacting washer 47, springs 42 remain under compression. Springs 42 are thus held in place between spring retaining ring 40 and primary stationary disc 33 and will not fall out during shipping or while mounting.

Brake 10 thus has a pre-mounting orientation in that the shipping bolts 25 hold the disc assembly 30 together and within the housing 11. Further, the springs 42 are held in place by the spring retaining ring 40, primary stationary disc 33 and the pin assembly 44. This orientation enables brake 10 to be easily mounted because the components stay assembled in a single unit during mounting. Further, rotating discs 29 are prevented from rotating and held aligned by the shipping bolts 25 such that the splines 31 of each rotating disc 29 are aligned. This allows the rotating discs 29 to easily slide onto the and couple with the shaft splines.

Once the brake 10 is mounted to a shaft, the shipping bolts 25 are no longer necessary to keep the disc assembly 30 together and may be removed. Once removed, rotating discs 29 are free to rotate with the shaft. A plug (not shown) is inserted into bores 24 following the removal of the shipping bolts 25.

Figure 2:
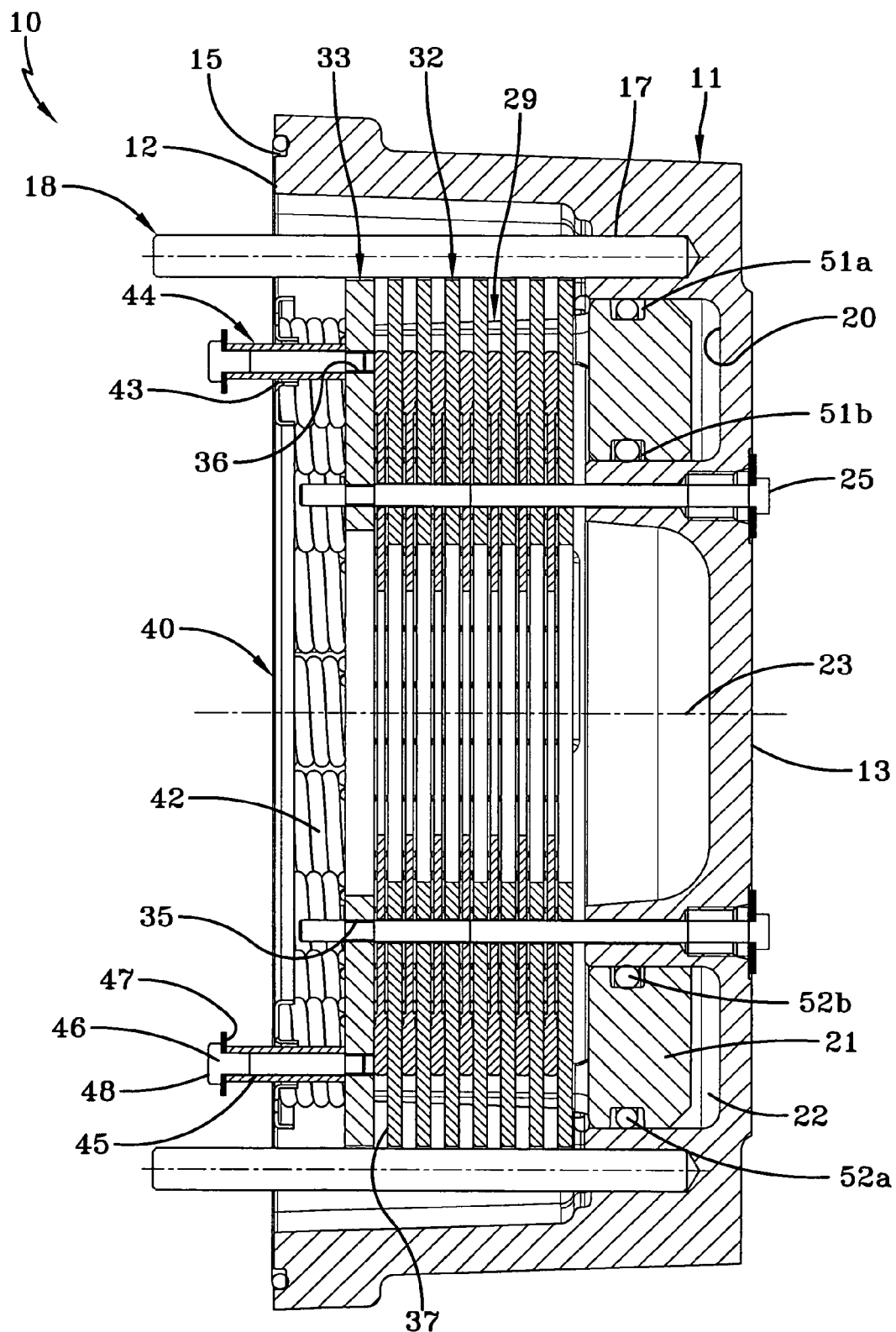
FIG. 2 is a sectional view of the assembled brake assembly of FIG. 1 as mounted and before the removal of shipping pins.
Figure 3:
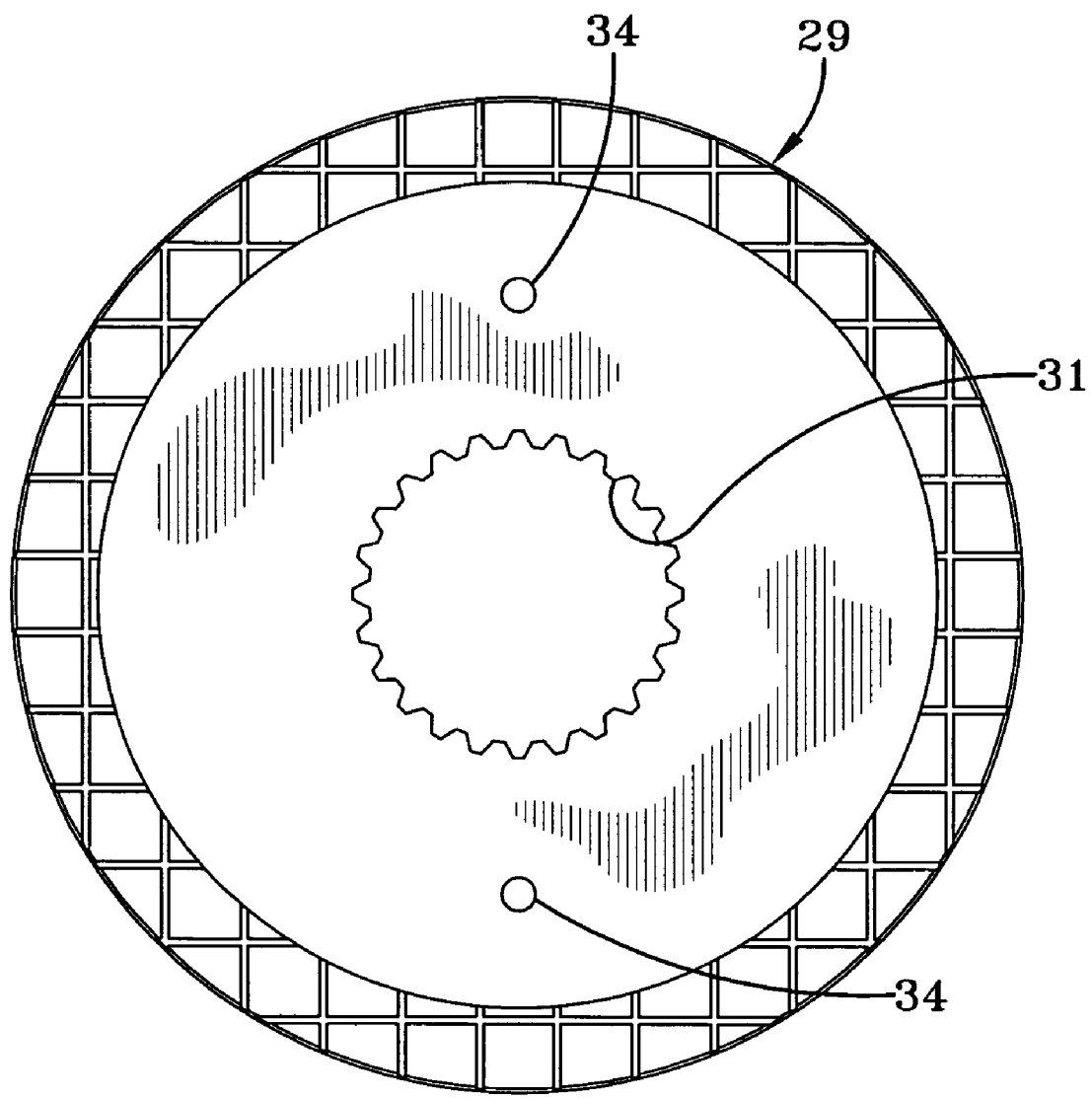
FIG. 3 is an elevational view of a rotating disc.
Figure 4:
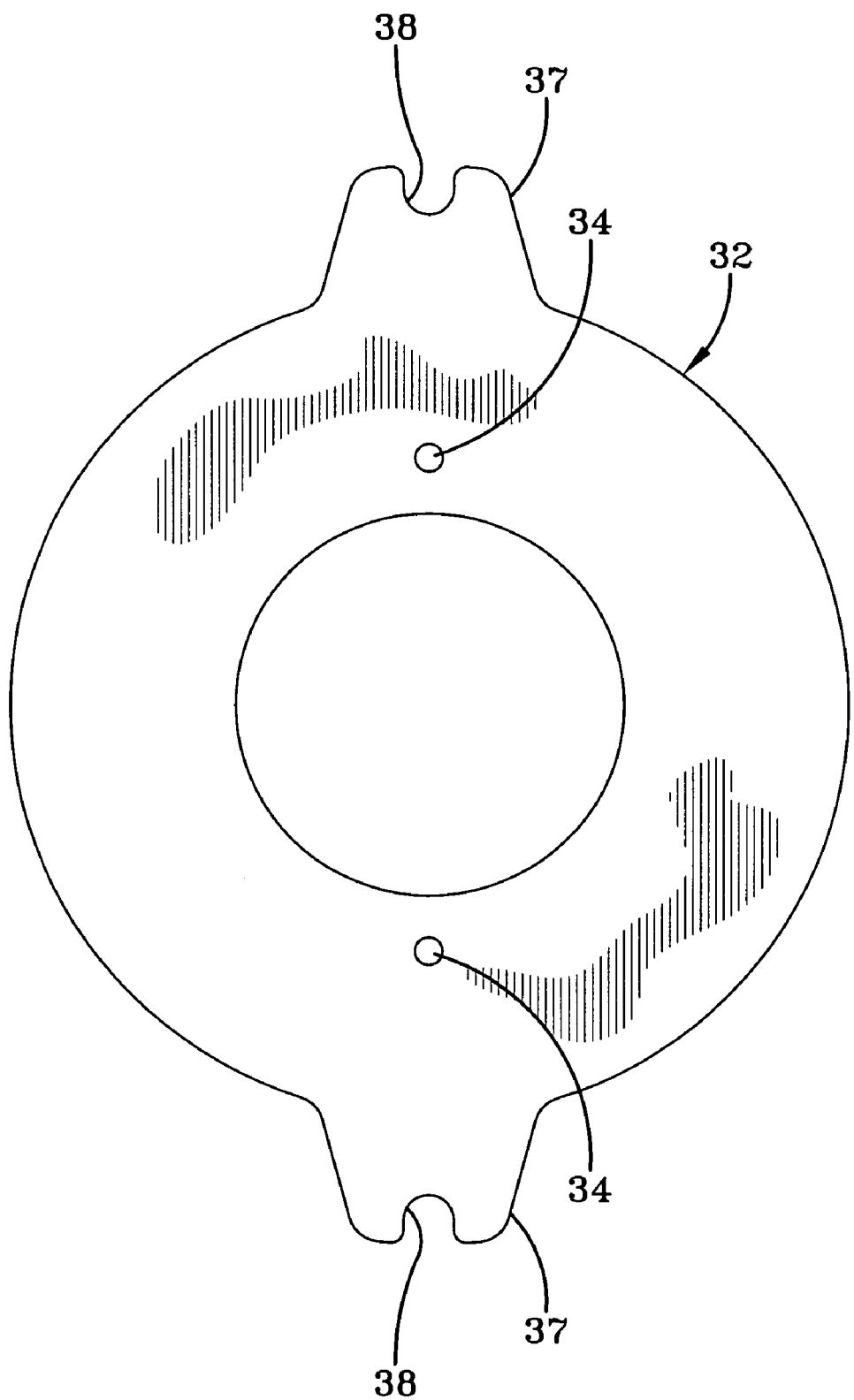
FIG. 4 is an elevational view of a stationary disc.
Figure 5:
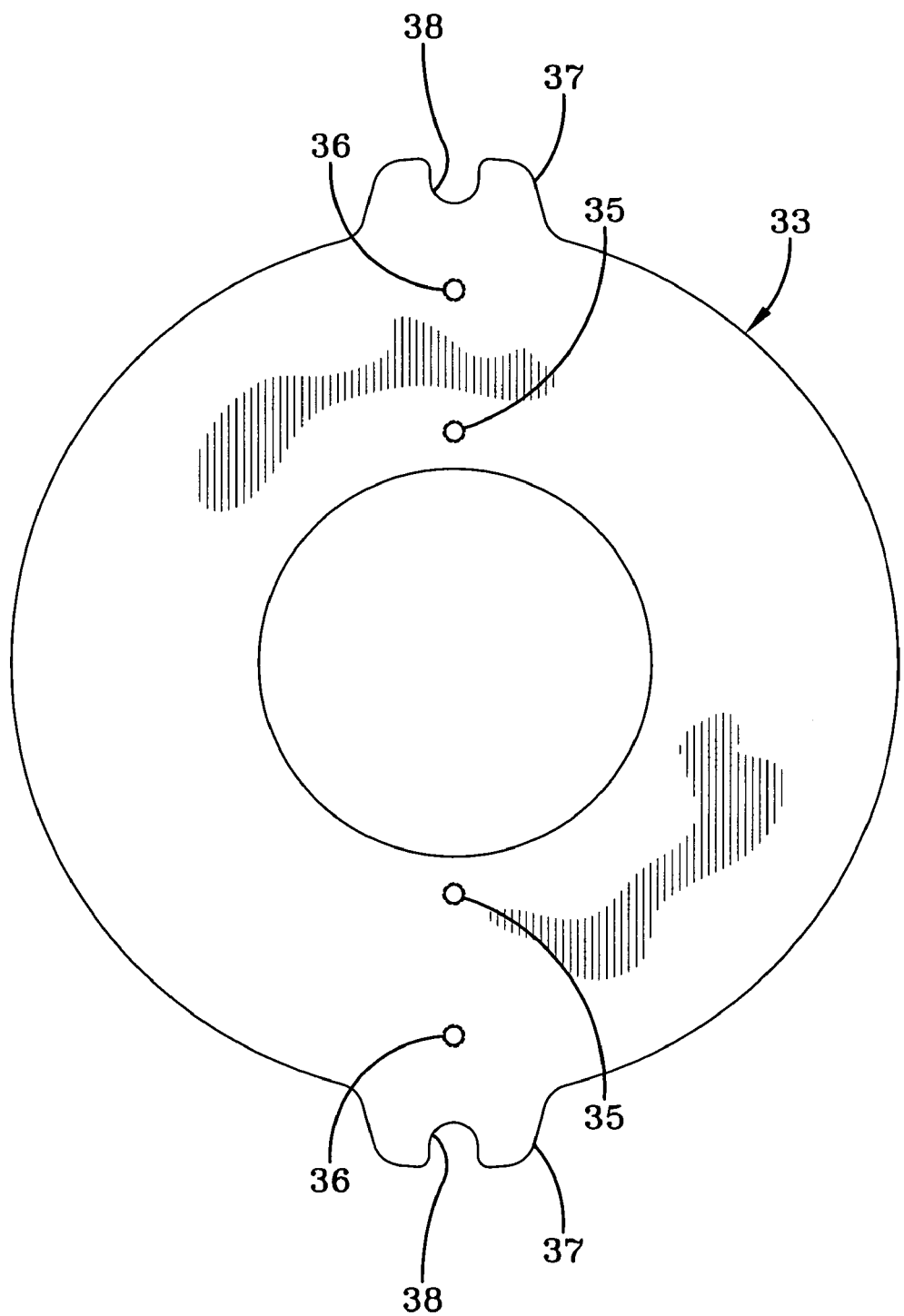
FIG. 5 is an elevational view of the primary stationary disc.

Further, the vehicle or machine is provided with bores which are sized to allow pin assembly 44 to project therethrough when mounted. When mounted, the spring retaining ring 40 no longer rests against washers 47, but now rests against the vehicle body. As is evident from FIG. 2, when mounted, spring retaining ring 40 is coplanar with the open end 12 of housing 11. As mounted, the springs 42 exert a spring force on the primary stationary disc 33, and because the rotating and stationary discs 29 and 32 are free to slide axially, the springs act to clamp together the disc assembly 30.

As previously described, piston 21 is positioned for movement within circumferential channel 20 formed in housing 11. Piston 21 includes an annular body portion 50, which is adapted to slide within circumferential channel 20. The body portion 50 is provided with an annular radially exterior groove 51a and an annular radially interior groove 51b. Grooves 51a and 51b allow a pair of seals 52a and 52b to be positioned therein such that seals 52a and 52b contact the piston 21 and circumferential channel 20, so that a brake fluid, such as oil, is maintained within reservoir 22. This oil communicates with reservoir 22 through the aforementioned input bore.

Piston 21 is further provided with a plurality of projections 53 which project axially from the body portion and contact the primary stationary disc 33. In this manner, piston 21 bypasses rotating and stationary discs 29 and 32 and acts directly on the primary stationary disc 33. When piston 21 is actuated, projections 53 push the primary stationary disc toward the vehicle body thereby compressing springs 42.

As mounted, brake 10 applies a braking torque when no hydraulic fluid under pressure is supplied to the brake. This type of brake is commonly referred to as a failsafe brake, because its natural unactuated state prevents shaft rotation. Braking force is supplied by the springs 42, which push primary stationary disc 33 away from the vehicle body. With no other axial forces present, springs 42 will clamp the disc assembly 30 together between primary stationary disc 33 and housing 11. In this condition, friction between the rotating discs 29 and the stationary and primary stationary discs 32 and 33 applies a torque to the stationary discs urging them to rotate. However, because ears 37 are confined by torque pins 18, stationary discs 32 and the primary stationary disc 33 will not rotate and a braking torque is applied to the shaft. This failsafe mechanism prevents unwanted and often times dangerous shaft movement.

When the vehicle or machine is turned on, hydraulic fluid may be supplied to the circumferential channel either automatically or by operator control. As the hydraulic fluid under pressure is received in the circumferential channel 20, it acts on piston 21 pushing it axially away from the closed end 13 of housing 11. Projections 53 transfer the piston force to primary stationary disc 33, countering the force of springs 42. If sufficient pressure is supplied within circumferential channel 20, the force of piston 21 will overcome the spring force, thereby moving primary stationary disc 33 axially towards the vehicle body to disengage the disc stack and allowing the free rotation of rotatable discs 29.

In view of the foregoing, it should thus be evident that a brake as described herein accomplishes the objects of the present invention and otherwise substantially improves the art.

What is claimed is:

1. A brake adapted to be carried by a rotatable shaft comprising a housing having an open end; a plurality of stationary discs in said housing; a plurality of rotatable discs adapted to rotate with the shaft; said rotatable discs being positioned to be engaged by said stationary discs; a plurality of springs biasing said stationary discs to engage said rotatable discs; a piston movable to oppose the force of said springs; said housing, said rotatable discs and said stationary discs each having at least one bore; a shipping bolt adapted to be received in each said bore during shipping and installation of said brake, and adapted to be permanently removed after positioning of said brake on said shaft.

2. A brake according to claim 1 wherein said bolt includes a threaded portion, one of said bores of said stationary discs being provided with threads, said threads receiving said bolt threaded portion.

3. A brake according to claim 1 wherein said open end of said housing is adapted to be mounted to a vehicle body.

4. A brake according to claim 1 wherein said rotating discs include splines on the radially interior portion, said splines are adapted to mesh with splines on the rotating shaft.

5. A brake according to claim 4 wherein when said shipping bolts are received in said bores, said splines of said rotating discs are aligned.

6. A brake according to claim 1 wherein said piston includes an annular body portion and a plurality of projections, said piston being moveable by a pressurized fluid to cause said projections to apply a force to the stationary disc which is proximate to said springs.

7. A brake according to claim 6 wherein when no said pressurized fluid is provided, said springs cause said stationary discs to engage said rotatable discs, applying a torque to the shaft.

8. A brake according to a claim 1 wherein when said piston is actuated and applies a force greater than the force of said springs, said stationary discs and said rotatable discs disengage.

9. A brake adapted to be carried by a rotatable shaft comprising, a housing having an open end, a plurality of stationary discs in said housing, a plurality of rotatable discs adapted to rotate with the shaft, said rotatable discs being positioned to be engaged by said stationary discs, a plurality of springs biasing said stationary discs to engage said rotatable discs, a piston movable to oppose the force of said springs, a plurality of pin assemblies, and a spring retaining ring slidably mounted to said pin assemblies, said springs being retained between said spring retaining ring and one of said stationary discs by the pin assemblies during shipping and installation of said brakes.

10. A brake according to claim 9 wherein said pin assemblies are carried by one of said stationary discs.

11. A brake according to claim 10 wherein prior to positioning the brake on the shaft, the force of said springs maintains said spring retaining ring spaced from said one of said stationary discs.

12. A brake according to claim 11 wherein said pin assembly includes a washer which provides a stop for said spring retaining ring.

13. A brake according to claim 9 wherein said pin assembly includes a washer, a screw and a spacer, said screw including a screw head and wherein said spacer and said washer are held between said screw head and said stationary disc.

14. A brake according to claim 9 wherein when said brake is positioned on the shaft, said spring retaining ring is adapted to interface with a vehicle body, wherein the body is provided with holes which are adapted to allow said pin assemblies to reside therein.

15. A brake according to claim 9 wherein said piston includes an annular body portion and a plurality of projections, said piston being moveable by a pressurized fluid to cause said projections to apply a force to the stationary disc which is proximate to said springs.

16. A brake according to claim 15 wherein when no said pressurized fluid is provided, said springs cause said stationary discs to engage said rotatable discs, applying a torque to the shaft.

17. A brake according to a claim 9 wherein when said piston is actuated and applies a force greater than the force of said springs, said stationary discs and said rotatable discs disengage.

18. A brake adapted to be carried by a rotatable shaft comprising a housing having an open end; a plurality of stationary discs in said housing; a plurality of rotatable discs adapted to rotate with the shaft; said rotatable discs being positioned to be engaged by said stationary discs; a plurality of springs biasing said stationary discs to engage said rotatable discs; a piston movable to oppose the force of said springs; said housing, said rotatable discs and said stationary discs each having at least one bore; a shipping bolt received in each said bore; a plurality of pin assemblies; and a spring retaining ring slidably mounted to said pin assemblies, said springs being retained between said spring retaining ring and one of said stationary discs prior to positioning the brake on the shaft, said bolts being adapted to be received in each said bore during shipping and installation of said brake and adapted to be permanently removed after positioning of said brake on said shaft.

19. A brake adapted to be carried by a rotatable shaft and to be mounted on a vehicle body comprising a housing having an open end and a plurality of holes, a plurality of stationary discs in said housing, a plurality of rotatable discs adapted to rotate with the shaft, said rotatable discs being positioned to be engaged by said stationary discs, a plurality of springs biasing said stationary discs to engage said rotatable discs, a piston movable to oppose the force of said springs, and a plurality of torque pins received in said housing holes and projecting from said housing, said torque pins being adapted to be received in corresponding holes in the vehicle body thereby aligning the brake during mounting.

20. A brake adapted to be carried by a rotatable shaft comprising a housing having an open end; a plurality of stationary discs in said housing; a plurality of rotatable discs are provided with a splined radially inner portion which is adapted to mesh with a splined portion of the shaft; said rotatable discs being positioned to be engaged by said stationary discs; a plurality of springs biasing said stationary discs to engage said rotatable discs; a piston movable to oppose the force of said springs; said housing, said rotatable discs and said stationary discs each having at least one bore; a shipping bolt received in each said bore, said bolts holding said splined portions of said rotatable discs in an aligned orientation to facilitate easy mounting to the splined portion of the shaft, said shipping bolts being removed after positioning the brake on the shaft to allow rotation of said rotatable discs.

* * * * *